United States Patent
Iyer

(10) Patent No.: US 7,685,317 B2
(45) Date of Patent: Mar. 23, 2010

(54) LAYERING MOBILE AND VIRTUAL PRIVATE NETWORKS USING DYNAMIC IP ADDRESS MANAGEMENT

(75) Inventor: Prakash N. Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2161 days.

(21) Appl. No.: 10/262,436

(22) Filed: Sep. 30, 2002

(65) Prior Publication Data
US 2004/0073642 A1 Apr. 15, 2004

(51) Int. Cl.
*G06F 15/16* (2006.01)
*H04W 4/00* (2006.01)

(52) U.S. Cl. ............. 709/248; 455/435.1; 455/433
(58) Field of Classification Search ........ 709/248; 455/435.1, 433
See application file for complete search history.

(56) References Cited

U.S. PATENT DOCUMENTS 6,622,016 B1 * 9/2003 Sladek et al. ........... 455/414.1
6,697,354 B1 * 2/2004 Borella et al. ........... 370/352
6,856,624 B2 * 2/2005 Magret ................. 370/392
6,915,325 B1 * 7/2005 Lee et al. .............. 709/202
6,954,790 B2 * 10/2005 Forslow ................ 709/227

* cited by examiner

*Primary Examiner*—Tonia L Dollinger
*Assistant Examiner*—Asghar Bilgrami
(74) *Attorney, Agent, or Firm*—Blakely, Sokoloff, Taylor & Zafman LLP

(57) ABSTRACT

The present invention allows a mobile node to seamlessly move across IP (Internet Protocol) subnets. In one embodiment, the invention includes registering a mobile device with a home agent (HA) through a proxy server, receiving a home internet protocol (IP) address assignment from the HA, assigning the home IP address to the mobile device as an inner IP address, mapping the inner IP address to a physical point-of-attachment of the mobile device, and assigning an outer IP address. The embodiment further includes tunneling packets for the mobile device to the proxy server using the inner and outer IP address, and delivering packets from the proxy server to the mobile device at the point-of-attachment.

25 Claims, 7 Drawing Sheets

LAYERING MOBILE AND VIRTUAL PRIVATE NETWORKS USING DYNAMIC IP ADDRESS MANAGEMENT

FIELD OF THE INVENTION

The present invention relates to the field of addressing mobile nodes for communication in different data networks and more particularly to integrating mobility agents to provide data services inside and outside virtual private networks to mobile terminals moving between different wired and wireless data networks.

BACKGROUND

Mobile Internet Protocol (Mobile IP or MIP) is an Internet Engineering Task Force (IETF) network layer protocol, specified in RFC-3344. It is designed to allow seamless connectivity session maintenance under TCP (Transmission Control Protocol) or other connection oriented transport protocols when a mobile node moves from one IP subnet to another. MIPv4 uses two network infrastructure entities, a Home Agent (HA) and an optional Foreign Agent (FA), to deliver packets to the mobile node when it has left its home network. MIPv4 also supports point-of-attachment Care-of Addresses (CoA) if a FA is unavailable. Mobile IP is increasingly being deployed for 2.5/3G (2.5 or third generation wireless) provider networks and may be deployed in medium and large Enterprise IEEE 802.11-based LANs (Local Area Networks) with multiple subnets.

MIPv4 relies on the use of permanently assigned "home" IP addresses to help maintain connectivity when a mobile device connects to a foreign network. On the other hand, IPsec-based (Internet Protocol Security, a security protocol from IETF) VPNs (Virtual Private Networks) use a tunneling scheme in which the outer source IP address is based on a CoA at the point-of-attachment and an inner source IP address assigned for the "home" domain. In general if either address is changed, such as when the mobile node switches IP subnets, then a new tunnel is negotiated with new keys and several round trip message exchanges. The renegotiation of the tunnel interferes with seamless mobility across wired and wireless IP networks spanning multiple IP subnets.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
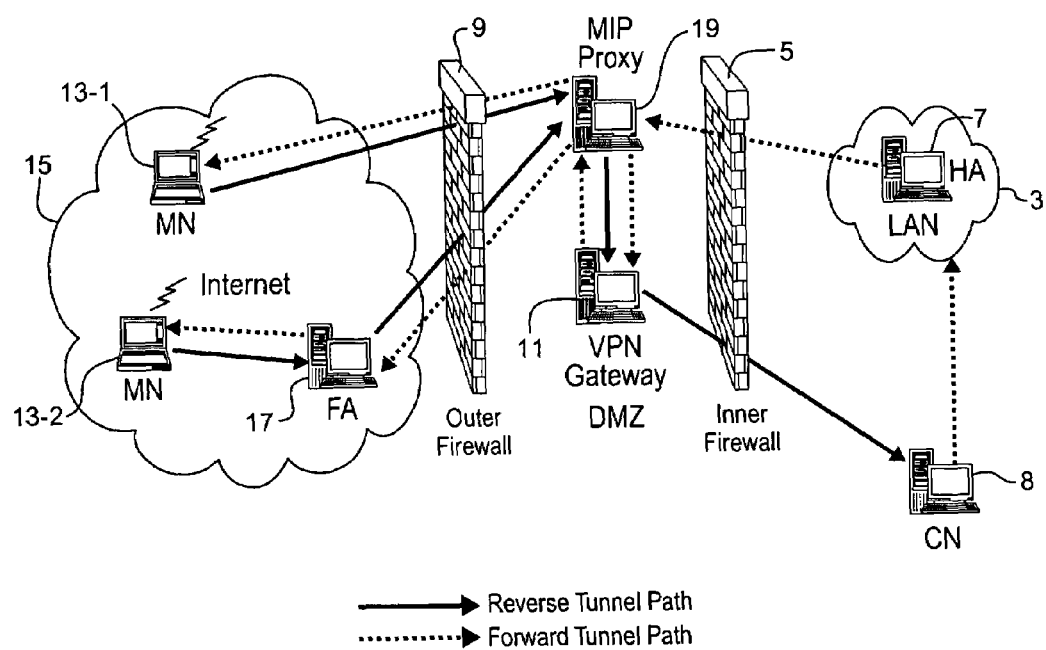
FIG. 1 is a diagram of a mobile node outside of a VPN Gateway and a firewall according to one embodiment of the present invention.

The present invention allows a mobile node to move across IP (Internet Protocol) subnets and back again seamlessly and without tunnel renegotiation. The mobile node remains reachable from other nodes at all times during the moves. The implementation is robust and causes little if any disruption to the configuration of the home service.

In one embodiment, a permanent home IP address can be used as a tunnel inner IP address and assigned to a VPN (Virtual Private Network) interface without losing any MIP (Mobile IP) functionality. The use of this type of static IP address overcomes a major barrier to seamless mobility and avoids VPN tunnel renegotiation every time the mobile node changes subnets. Assigning the same IP address to two different physical or virtual network interfaces is not acceptable to a TCP/IP (Transmission Control Protocol/Internet Protocol) stack because of the routing ambiguity. Accordingly, the VPN tunnel outer IP address may be a static, non-routable IP address or a dynamically assigned routable IP address not in conflict with addresses currently assigned to other virtual or physical network interfaces. In either case the VPN tunnel outer IP address need never be made visible to the routing infrastructure. The VPN outer IP address, if it is never routed in the Internet or the Intranet, can be reused by many different mobile nodes. This reduces the need to assign additional scarce IPv4 addresses to VPN-enabled mobile nodes and helps maintain VPN tunnel sessions across CoA (Care of Address) changes that are essentially invisible to the VPN client.

To keep routing issues simple, the permanent home IP address and the tunnel inner IP address can be kept the same (i.e. invariant) even as the mobile node moves across subnets. The VPN outer IP address can be used to eliminate the need for tunnel renegotiation every time a mobile device switches IP subnets. It also avoids the computational expense of key management and avoids round trips that delay handoffs.

The VPN outer IP address or permanent home IP address can be applied to systems without any resource impact to the attached network. The present invention applies to scenarios in which a user moves across a DMZ (De-Militarized Zone) boundary (e.g. from an Intranet wired subnet to an Extranet wireless subnet) using adaptive combinations of Mobile IPv4 and IPsec-based VPNs.

One embodiment of the invention will be described in the context of a mobile node that has a home service within a secure network (e.g. an Enterprise Intranet). Using a VPN, the mobile node, can move beyond the DMZ into a wireless IP based access packet data network, such as a hotspot for 802.11a or b (proposed standards for wireless local area networks developed by an Institute of Electrical and Electronic Engineers (IEEE) committee) and activate Mobile IP to retain transparent session persistence and reachability. However, the invention is applicable to many other types of data networks. These can include Bluetooth (a standard for short range wireless two-way radio monitored by the Bluetooth Special Interest Group), Wired or Wireless Ethernet, and other radio packet data systems as well as a full range of wired connections.

Referring to FIG. 1, a LAN (Local Area Network) 3 is secured behind an inner firewall 5, as is well-known in the art. The LAN can include a large number of different types of terminals in communication with each other using Ethernet, or any other type of conventional physical connection. The physical connection may be wired or wireless. The LAN includes at least one HA (Home Agent) 7 as defined in the standards for MIP. It can also include any number of CNs (Correspondent Nodes e.g. as defined in RFC-3344) 8 in communication with the MN or any other nodes inside and outside of the LAN. The LAN is further secured by a conventional outer firewall 9 and a VPN Gateway 11 sits in the DMZ between the firewalls. The VPN typically handles tunneling between the LAN and any external nodes, networks or subnets.

In the example of FIG. 1, a MN (Mobile Node) 13 with a usual home location at the LAN 3 has roamed outside the firewall to an external network or subnet 15. The MN can be any of wide range of different types. It can be embodied in an external radio coupled to a portable computer or in a stand-alone device. Such devices can include a cellular telephone, or data messaging appliances, a plug-in card, such as a PCMCIA, MultiMedia or SDIO card, or an internal component that can connect to an internal bus, using, for example a Compact PCI, ISA (Industry Standard Architecture) connection, or internal motherboard bus. Any of these devices can be coupled to a computer, laptop or palmtop computer, PDA (personal digital assistant), web tablet or any other type of device for power and user interface functionality. Depending on the nature of the external network, the MN can communicate with the home LAN directly 13-1 or 13-2 through a FA (Foreign Agent) 17, as defined for example in MIPv4. In direct communications, the MN may be connected from behind a NAT (Network Address Translation) gateway.

The FA provides an alternative way of providing a connection back to the Home Agent. The MN may discover the Mobile IP Foreign Agent in a hotspot, for example. A MIP FA advertises its presence to the network at regular intervals, allowing it to be easily discovered by devices entering the network. The FA will normally have at least one routable public address and the MN can attempt to register via the FA. The FA advertised public address can be used as a point-of-attachment address, or as shown in FIG. 1, as 13-1, the MN can use another address to register with its HA using, for example, MIP registration. The FA can be used to advantage to quickly establish connectivity with a HA. Typically a FA has 2 basic functions: to support multiple MNs with one or a small number of routable IPv4 addresses; and to provide local AAA (Authentication, Authorization, and Accounting) services.

According to one embodiment of the present invention, a MIP (Mobile Internet Protocol) Proxy server 19 is also located within the DMZ. Alternatively, a HA may be present in the DMZ or even in an external network. The proxy server or HA in either location can extend mobility to the MN in the external network. In each situation an HA in the Internet LAN 3 can be used to maintain reachability from the CN 8.

Figure 2A:
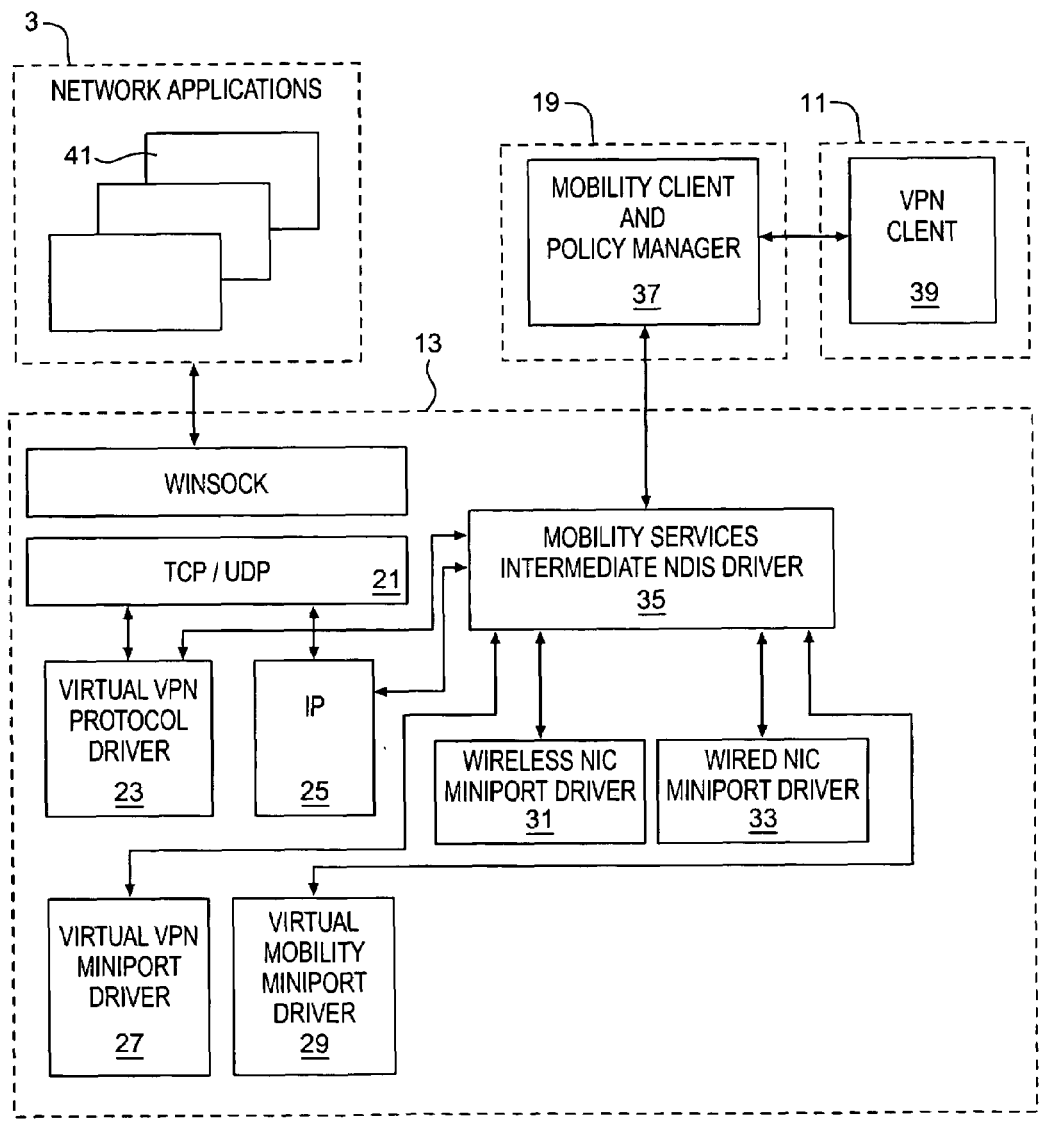
FIG. 2A is a block diagram of some modules used by systems of FIG. 1.

FIG. 2 shows a block diagram of modules that can be used in implementing the present invention in an embodiment specifically adapted for a Microsoft Windows® version of a MN (client) network stack. Such a VPN client can be implemented in several different ways. Some examples follow: 1. The IPsec VPN client can be implemented in a combination of a virtual protocol driver (situated at logical equivalence with the IP protocol in the network stack) and a virtual network interface driver, situated below the IP protocol 2. The Internet Protocol (IP) and IPsec VPN client can be combined in the same module 3. The IPsec VPN client can be entirely implemented as a layered intermediate network device driver situated below the IP protocol 4. The IPsec VPN client can be implemented in a combination of a layered intermediate network device driver and a virtual network interface driver, both situated below the IP protocol Referring to FIG. 2A (which depicts an IPsec VPN client implemented as suggested by example 1 above), the MN 13 contains a TCP/UDP (Transmission Control Protocol/User Datagram Protocol) interface 21 which is coupled to an IP protocol module 25. The IP protocol module is bound to a Mobility Services Intermediate Driver 35 which in turn exposes network bindings corresponding to the Virtual VPN Miniport driver 27 and Virtual Mobility Miniport driver 29. A Virtual VPN Protocol Driver 23 has similar bindings and can be regarded as a peer of the IP protocol module 25 from the perspective of network layers. The Virtual VPN Protocol Driver 23 communicates via a private interface with a Virtual VPN Miniport Driver 27 which can be implemented as a NIC.

The Mobility Services Intermediate NDIS (Network Driver Interface Specification as defined e.g. by Microsoft or any equivalent specification) Driver (MSID) 35 in this example layers between the Virtual VPN Miniport Driver and a Virtual Mobility Miniport Driver 29, and a Mobility Client and Policy Manager 37. The Mobility Client and Policy Manager is part of the MIP Proxy 19. The MSID also manages network bindings with the physical adapter interfaces such as a Wireless NIC Miniport Driver 31 and a Wired NIC Miniport Driver 33. Similarly, in this example, the Virtual VPN Miniport Driver is bound to the MIP home addresses, the Virtual Mobility Miniport Driver 29 is bound to the VPN outer IP address. The Wireless NIC Miniport Driver 31 is bound to a wireless point-of-attachment care of address and the Wired NIC Miniport Driver 33 is bound to the wired point-of-attachment care of address. The Mobility Client and Policy Manager 37 interfaces directly during a session with a VPN Client 39 which in turn communicates with the VPN Gateway 11.

The communication interface between the application and network layers 41 on the MN 13 can be through an interface, such as WINSOCK (Windows® Socket, an application programming interface for Microsoft applications) 22 as shown in FIG. 2, however, for other types of MN applications other interfaces can be applied. In the present example, WINSOCK serves as an API to the layers below. The TCP/UDP module 21 together with the WINSOCK allow the MN 13 to communicate with a variety of different network applications 41 as well as with correspondent nodes one either side of the DMZ. The modules, interfaces, and drivers shown in FIG. 2 are provided as an example only and many other configurations are possible as may be desired for specific applications.

Continuing with the example of FIG. 2A, when the MN moves from a network not requiring a VPN tunnel, such as its home LAN 3, to a network that does, such as an external network 15, the mobile IP (mobility) services driver 35 and client 37 first register with the actual Home Agent 7 through a Mobile IP Proxy 19 situated in the DMZ. As part of the registration process, the mobile node may use a pre-assigned static home IP address or obtain one from the actual Home Agent. The mobility client 37 interfaces with the VPN client 39 to have the home address assigned to the Virtual VPN Miniport Driver 27. The mobility client 37 then assigns the VPN tunnel outer IP address (as described earlier) to the Virtual Mobility Miniport Driver 29. In one embodiment, the MIP Proxy 19 assigns this outer IP address to the Mobility Client 37.

In the present example, the mobile client also activates a VPN tunnel policy to ensure that all traffic is sent over a VPN tunnel. When the mobile client initiates data traffic, a VPN tunnel can be negotiated and established with the home IP address as the inner IP address and the fixed IP address as the outer IP address. This ensures that the VPN tunnel will not have to be renegotiated each time the mobile client switches IP subnets as its point-of-attachment. Keeping the inner IP address consistent with mobile IP requirements maintains routing consistency in the home network behind the firewall. In keeping with standard routing semantics, the mobile client tunnels the IP packets over a mobile IP reverse tunnel from its point-of-attachment care-of address, e.g. at either NIC Miniport Driver, to the MIP Proxy 19 in the DMZ.

To avoid routing abnormalities, the mobility services intermediate driver 35 can hide all physical NICs, 31, 33 from the TCP/IP stack (and VPN client when active). This ensures that all packets will be sent out via the virtual mobility NIC 29, giving the intermediate driver full flexibility in re-routing packets over the appropriate physical NIC. Hiding the physical NICs and their link status from the TCP/IP stack also allows for intelligent selection of the physical network interfaces for packet routing, transparent to the TCP/IP stack and applications above it. The Mobility Services Intermediate driver 35 can be used to ensure that at least one Physical NIC (31 and/or 33) is assigned a point of attachment care of address. The VPN client software on the MN only sees the Virtual Mobility VNIC as its physical NIC. In this way, the VPN tunnel, once established, does not have to change (i.e. be renegotiated and reestablished) each time the actual point-of-attachment IP address 31, 33 changes.

When a VPN session is deactivated, the mobile IP home address remains assigned to the Virtual VPN Miniport Driver 27 to avoid TCP/IP sessions from being terminated. The Mobility Services Intermediate driver manages the Virtual VPN Miniport Driver 27 and maintains its Link Up State. The VPN client can be managed in several different ways. A few such examples are provided below:

1. A VPN policy can be applied via VPN Client 39 to put the VPN in "pass through" mode with no IPsec applied to any packets.

2. The Mobility Services Intermediate driver 35 can suppress packets from reaching the Virtual VPN protocol driver, essentially redirecting packets directly to and from TCP/IP. In some cases when the Virtual VPN Miniport Driver 27 is put in promiscuous mode by the VPN client 39, this approach may not work. In that case, the following option may be feasible.

3. The Mobility Services Intermediate driver 35 can drop IPsec encrypted packets depending on the detection of the position of the MN (i.e. inside the Intranet or outside the DMZ). Non encrypted packets are forwarded correctly as desired.

The VPN tunnel outer IP address assigned to the Virtual Mobility Miniport Driver (VNIC) 29 in the above example does not necessarily have to be routable as long as it is unique across MN's attached to e.g. a MIP Proxy 19. This address may never be seen by routers on the Internet and therefore requires no special routing considerations. The MIP Proxy maps the MN home address to the invariant Virtual Mobility Miniport address. As a result, the VPN inner address and MIP home address stay the same as the MN changes physical addresses. The MIP Proxy and the Home Agent can be modified to support this change.

Figure 2B:
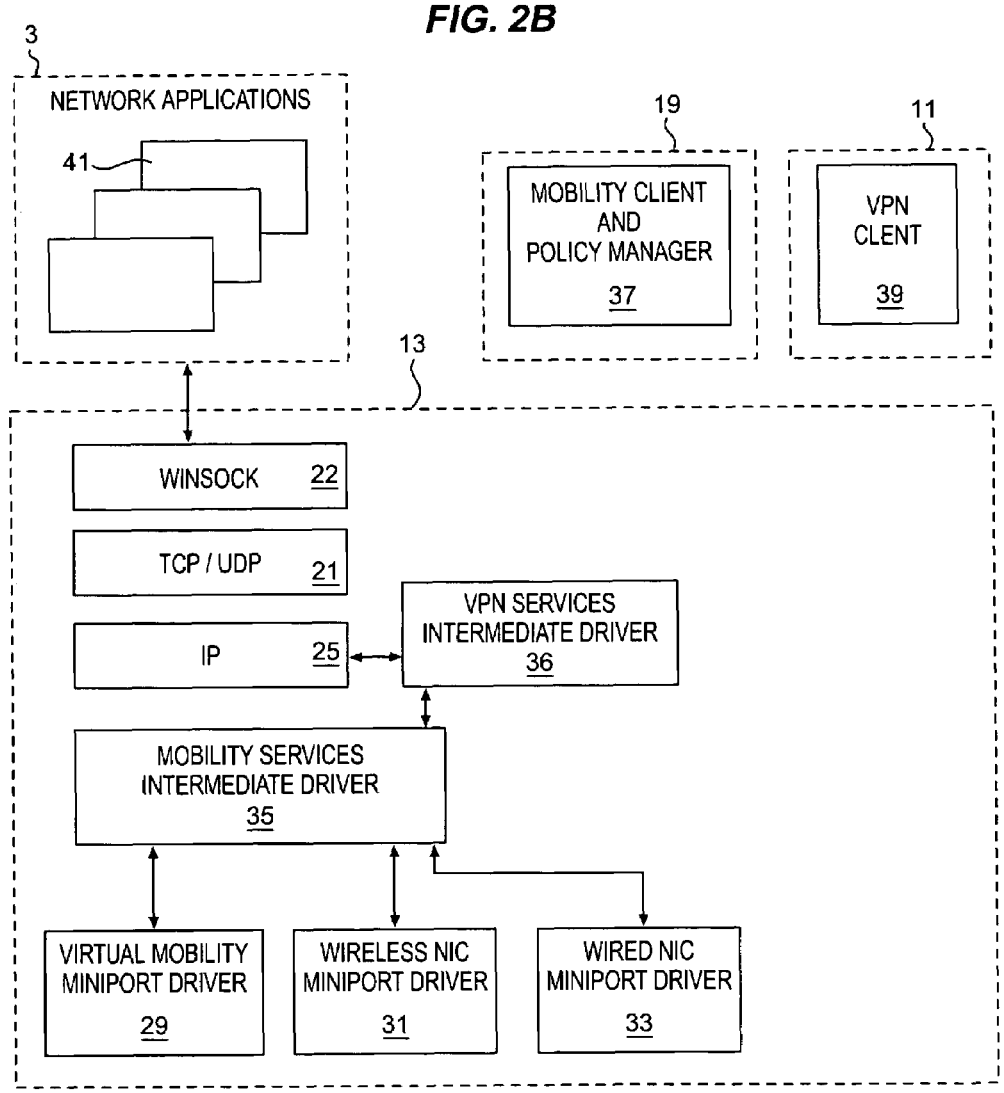
FIG. 2B shows an alternative embodiment of the modules of FIG. 2A

FIG. 2B shows a variation of the above example and is based on the third example of managing the VPN client suggested above. In this case, the VPN driver functionality is completely in a VPN Services Intermediate Driver 36 layered between TCP/IP 25 at its top and the Mobility Services Intermediate driver 35 below it. Further, the VPN driver does not need to implement a Virtual VPN Miniport Driver 27. The Virtual Mobility Miniport Driver 29 can always be bound to the MN home address as described in the previous example. Also, the VPN tunnel inner and outer IP addresses can be the same and equal to the MN home address. However, as there is only one NIC assigned to this address, there are no routing anomalies. Either one or both of the Wired and Wireless NIC Miniport Drivers 31, 33 is assigned the point of attachment care of address. The other elements of FIG. 2B are the same as is described above with respect to FIG. 2A.

Figure 2C:
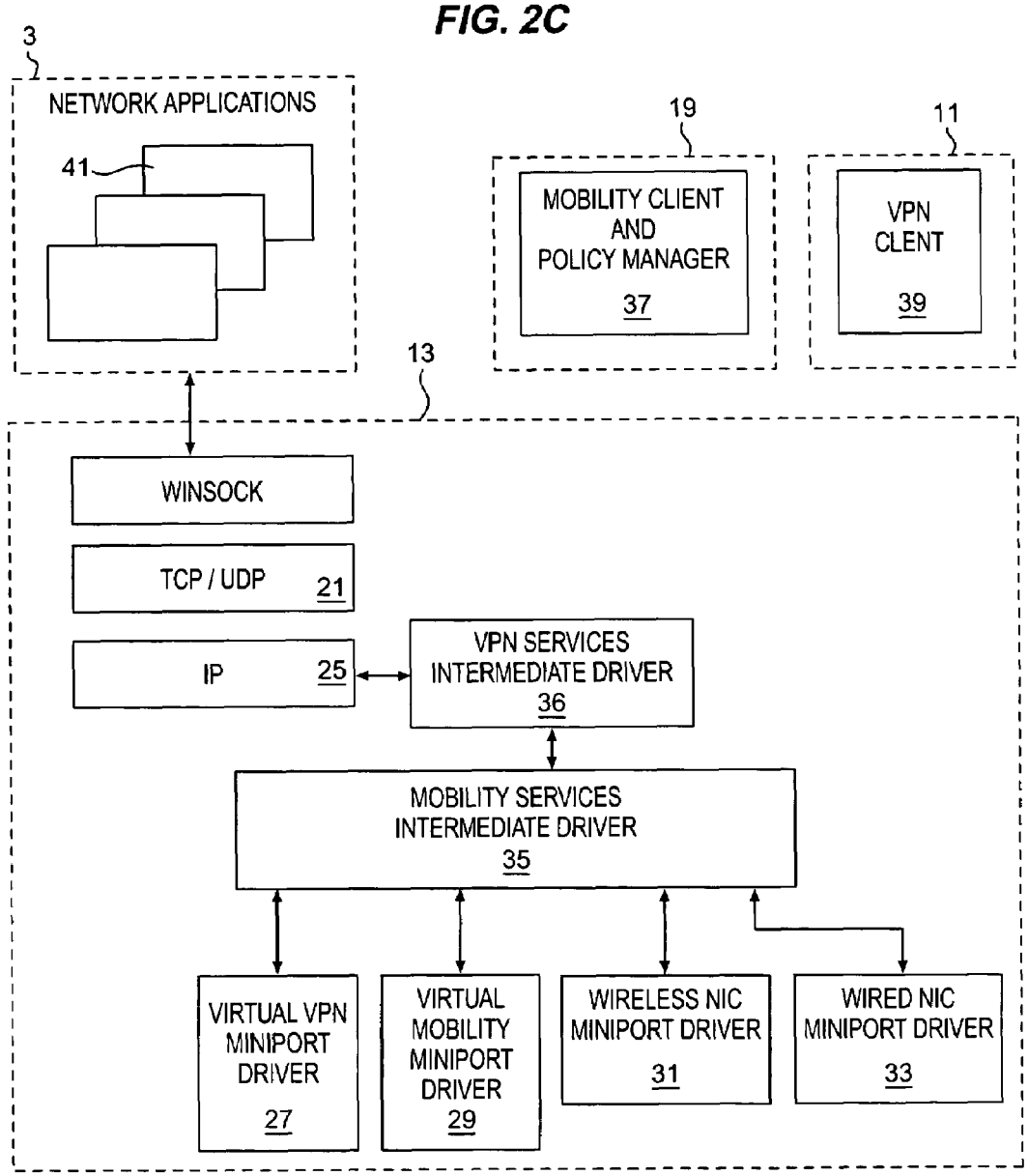
FIG. 2C shows another alternative embodiment of the modules FIG. 2A

FIG. 2C shows a variation of the above example and is based on the fourth example of managing the VPN client suggested above. In this scenario, the VPN driver is implemented in the VPN Services Intermediate Driver 36 plus a Virtual VPN Miniport Driver. The address assignments and NIC management are very similar to the discussion above for FIG. 2B. The other elements of FIG. 2C are the same as is described above with respect to FIG. 2A.

Figure 3:
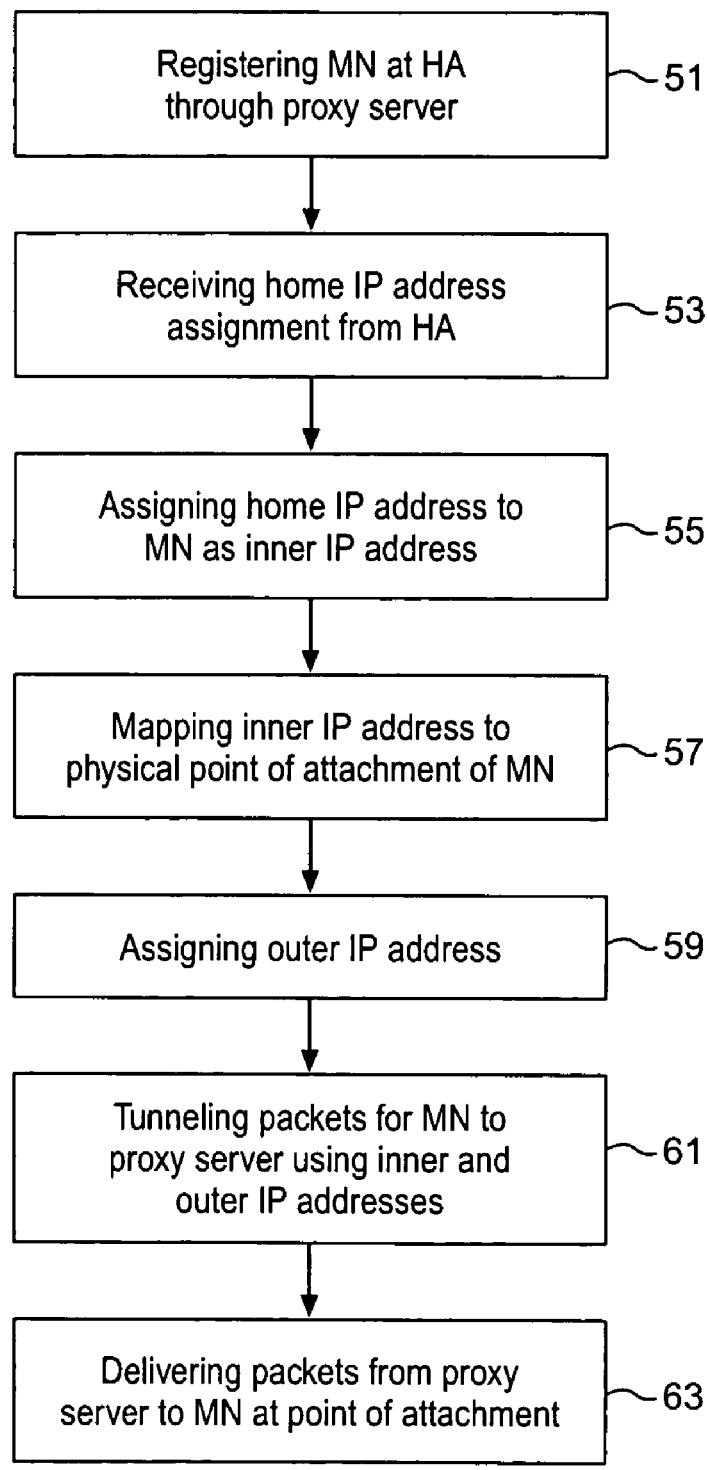
FIG. 3 is a flow diagram of providing connectivity to a mobile node according to one embodiment of the present invention.

FIG. 3 shows a process flow according to one embodiment of the invention. In FIG. 3, a mobile device or MN (mobile node) 13 has moved from a home LAN 3 to a physical point-of-attachment 17 outside the firewall 9. From this outside location, it can register 51 with a HA (Home Agent) 7 through, for example, a proxy server. This proxy server can be one for the VPN, such as the MIP Proxy 19 situated in a DMZ (de-militarized zone) as shown in FIG. 1. The physical point-of-attachment, can be registered through a mobile IP services driver 37 and a mobility client 39.

Upon registering, a home IP address assignment may be received 53 from the HA as defined in the protocols and standards for MIP (the home address can also be statically preassigned). This home IP address can then be assigned 55 to the MN as a VPN inner IP address e.g. at the Virtual Mobility Miniport Driver. In some embodiments, the home IP address can be assigned by the mobility client 37 to a VPN client 39. The inner IP address can then be mapped 57 to the current physical point-of-attachment of the mobile device. This can be done at the proxy server. In many applications, the physical point-of-attachment will be at a mobile IP wireless subnet. This is supported, e.g. in FIG. 2 by the Wireless NIC Miniport Driver, however the physical point-of-attachment can also be a wired connection.

Next, a VPN tunnel outer IP address can be assigned 59. One way to obtain the outer IP address is to negotiate it with the proxy server. With this VPN outer IP address, packets can be tunneled 61 from the MN to the VPN gateway via the MIP Proxy server. Using the VPN outer IP address, packets can also be delivered 63 from the proxy server to the mobile device at the point-of-attachment.

This embodiment allows for easy mobility as the MN can register with the HA through the proxy server from a second physical point-of-attachment. The inner IP address can then be mapped to the second physical point-of-attachment of the mobile device. This permits the inner IP address for the first physical point-of-attachment to be maintained for the second physical point-of-attachment.

Figure 4:
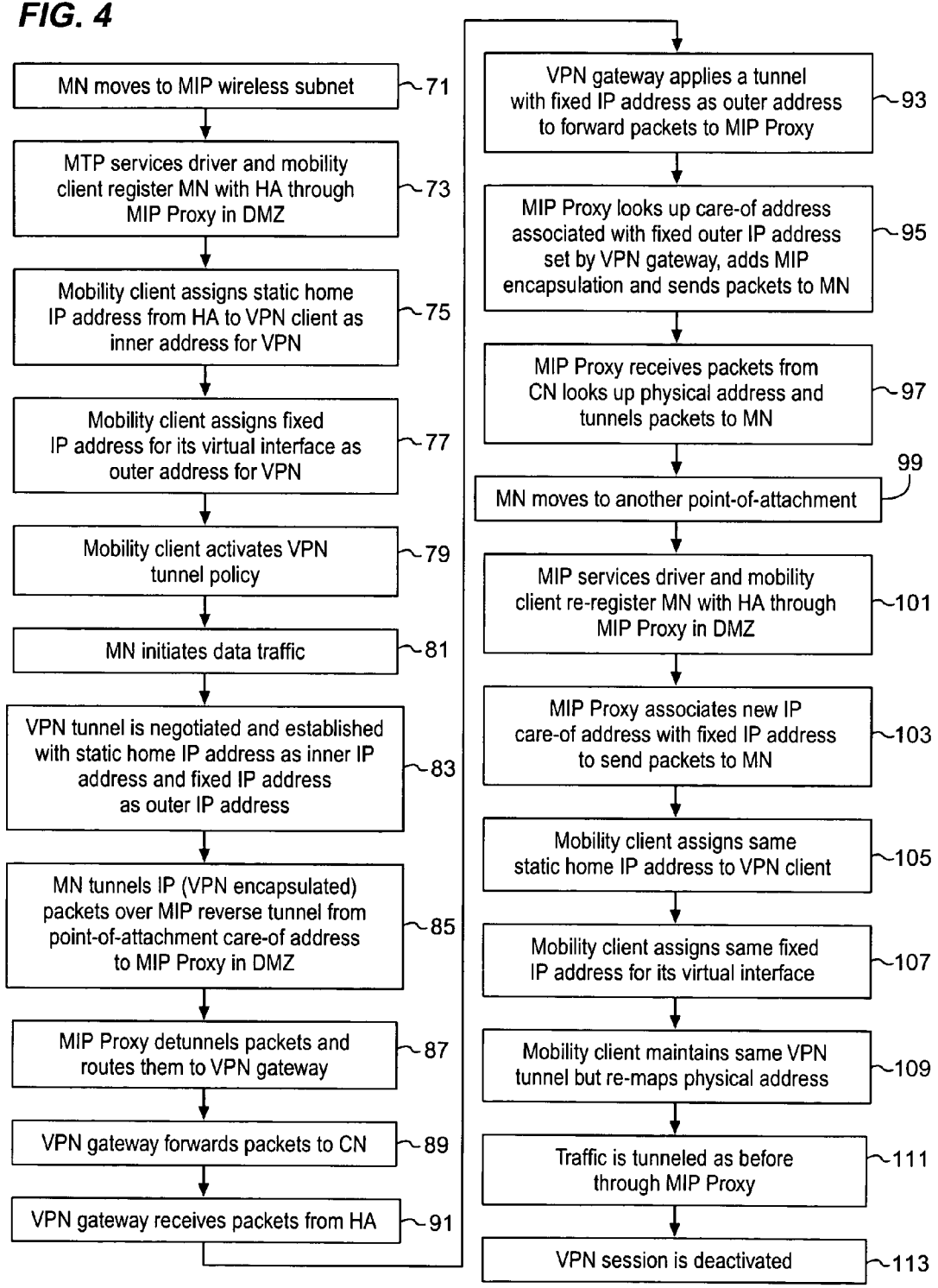
FIG. 4 is a flow diagram of providing connectivity to a mobile node according to another embodiment of the present invention.

FIG. 4 shows a more detailed example of the present invention. In the example of FIG. 4, the mobile device or MN moves to a mobile IP wireless subnet 71, or any other external network. While the invention is particularly well-suited to networks that are based on MIP, the invention is not limited to such applications. After the move, the mobile IP services driver (e.g. Mobility Services Intermediate NDIS Driver 35) and mobility client 37 register the mobile device with the Home Agent through a Mobile IP Proxy 19 situated in the DMZ 73. The mobility client assigns a home IP address, (received from the Home Agent or statically preassigned), to the VPN client. This is the tunnel inner IP address for the VPN 75. The mobility client also assigns a fixed IP address for its virtual interface. This is the VPN tunnel outer address for the VPN 77. The address could be assigned by the MIP Proxy 19. The mobility client can then activate the VPN tunnel policy 79.

When the mobile device initiates data traffic 81, a VPN tunnel is negotiated and established with the static home IP address as the inner IP address and the fixed IP address as the outer IP address 83. The mobile device can then tunnel the IP (VPN encapsulated) packets over a mobile IP reverse tunnel from the point-of-attachment care-of address to the MIP Proxy in the DMZ 85. The MIP Proxy detunnels the packets and routes them to the VPN gateway 87. Passing the tunneled packets from the Internet to the DMZ through the VPN gateway, allows the VPN tunnel to be terminated. The VPN gateway may in turn forward the packets to the CN (correspondent node) 89.

In the forward direction, the VPN gateway receives packets from the actual HA in the Intranet 91 behind the firewall. The VPN Gateway applies a tunnel with the invariant IP address as the outer address and is "fooled" into forwarding packets to the MIP Proxy which is masquerading as the MN 93. Upon receiving these packets, the MIP Proxy uses its table to look up the care-of address which is associated with the invariant outer IP address set by the VPN gateway. It adds a MIP encapsulation and sends the packets to the mobile device 95. The MIP Proxy also receives packets from the CN, looks up the physical address and tunnels the packets to the mobile device 97.

When the mobile device moves to another point-of-attachment 99, the mobile IP services driver and mobility client re-register the mobile device with the Home Agent through the Mobile IP Proxy situated in the DMZ 101. This is done in accordance with the MIP protocols in the same way as the first registration. The MIP Proxy then associates the new IP care-of address with the invariant IP address for the purpose of sending packets to the MN 103. This can be a replacement association or an additional association. The mobility client can then assign the same static home IP address to the VPN client 105, and the same fixed IP address for its virtual interface 107. This allows the mobility client to maintain the same VPN tunnel by mapping the new physical address 109 to the same fixed IP address.

Traffic is then tunneled as before through the MIP Proxy 111. When a VPN session is no longer deemed necessary by the MN policy manager, it can be deactivated 113. The policies can be chosen as the best balance between allowing reuse of static home IP addresses and avoiding tunnel renegotiation. If the MN is no longer registered with its actual HA then the static home IP address can be made available for reuse. This can be done without regard to registration at the MIP Proxy.

While embodiments of the present invention are described in the context of a wireless LAN subnet, the invention is not limited to such systems. The wireless LAN may be replaced, for example, by a GPRS (GSM Packet Radio System) wireless network and embodiments of the present invention can be applied to gateway support nodes that support heterogeneous roaming, such as a PDSN (Packet Data Serving Node). A PDSN is a gateway router in a CDMA 2000 (Code Division Multiple Access 2000, an International Telecommunication Union (ITU) standard for wireless cellular packet data) based 3GPP2 (Third Generation Wireless Partnership Project 2) mobility framework. In addition, the invention can be applied to very simple short range wireless subnetworks, such as an 802.11 hotspot. In the network of FIG. 1, the communicating entities are shown simply as nodes in order to emphasize the link layer which is important to the present invention. Each node also includes a physical layer (not shown) involving wireless and wired links with air interfaces and the accompanying baseband and radio frequency or infrared hardware.

Embodiments of the present invention enable seamless and continuous mobility between different access technologies. At the same time, session continuity is maintained for protocols running on top of IP. These benefits apply regardless of the type of networks involved, whether wired or wireless.

Figure 5:
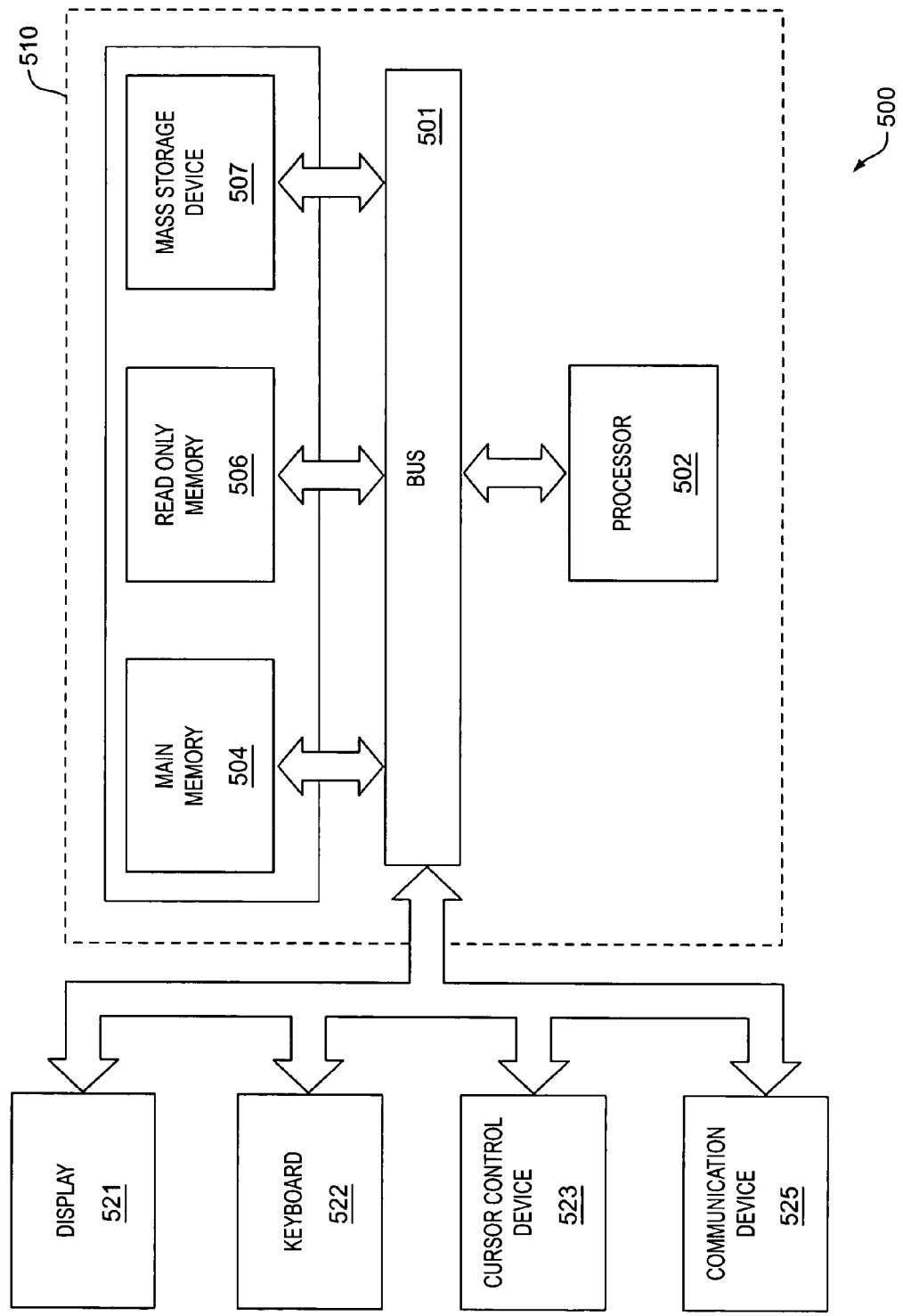
FIG. 5 is a block diagram of a computer system suitable for implementing the present invention.

FIG. 5 shows a computer system 510 representing an example of a system that can be used as a Home Agent 7, a mobile node 13, a MIP Proxy 19, or a VPN Gateway 11, as depicted in, for example FIG. 1. The mobile node can be implemented as a desktop or portable machine. It can also be implemented in one or more small portable platforms such as laptops, PDA's (Personal Digital Assistant), wireless web devices such as personal stereos, telephones and integrated messaging systems, and other devices. The servers are typically implemented as stationary devices. In either event, the computer system includes a bus or other communication means 501 for communicating information, and a processing means such as a microprocessor 502 coupled with the bus 501 for processing information.

The computer system further includes a main memory 504, such as a random access memory (RAM) or other dynamic data storage device, coupled to the bus 501 for storing information and instructions to be executed by the processor 502. The main memory also may be used for storing temporary variables or other intermediate information during execution of instructions by the processor.

The computer system may also include a nonvolatile memory 506, such as a read only memory (ROM) or other static data storage device coupled to the bus for storing static information and instructions for the processor. A mass memory 507 such as a magnetic disk or optical disk and its corresponding drive may also be coupled to the bus of the computer system for storing information and instructions.

The computer system can also be coupled via the bus to a display device or monitor 521, such as a cathode ray tube (CRT) or Liquid Crystal Display (LCD), for displaying information to a user. For example, graphical or text messages, web clippings and other data may be presented to the user on the display device. Typically, an alphanumeric input device 522, such as a keyboard with alphanumeric, function and other keys, may be coupled to the bus for communicating information and command selections to the processor. A cursor control input device 523, such as a mouse, a trackball, cursor direction keys or stylus pad can be coupled to the bus for communicating direction information and command selections to the processor and to control cursor movement on the display 521. A microphone 524 and speaker 525 can also be connected to the bus for communications purposes or to play back any received sounds.

A radio or other communications device 525 is also coupled to the bus 501. The radio subsystem can be coupled to the computer system in any of a variety of other ways including PCMCIA, MultiMedia, SDIO card, Compact PCI, ISA (Industry Standard Architecture), and an internal motherboard bus. The radio may also be a separate device, connected to the computer by cabling or similar electrical interface. The specific interconnection of the radio subsystem to the rest of the computer system does not affect the fundamental operation of the invention. There may be one communications device capable of communicating with several different networks or several communications devices each dedicated to a particular network.

Other communication devices may also be coupled to the bus such as a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

It is to be appreciated that a lesser or more equipped computer system than the example described above may be preferred for certain implementations. Therefore, the configuration of the computer system will vary from implementation to implementation depending upon numerous factors, such as price constraints, performance requirements, technological improvements, or other circumstances.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a mobile node moving between a VPN and an 802.11 hotspot, it can be applied to a wide variety of mobile radio systems and mobile radios that use a gateway-server type architecture. Such systems include digital cellular, WCDMA, cellular digital packet data and many other digital wireless packet data systems. The mobile node may be any of a variety of mobile wireless devices, including data-enabled telephones and messaging systems, PDA's, web-powered video and stereo systems and transportable computers coupled to data radios. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   registering a mobile device with a home agent (HA);
   once the registering has occurred, receiving at the mobile device a home internet protocol (IP) address assignment from the HA;
   assigning the home IP address to the mobile device as an inner IP address;
   mapping the inner IP address to a physical point-of-attachment of the mobile device;
   assigning an outer IP address directly to the mobile device from the HA;
   tunneling of packets between the mobile device and the HA using the inner and outer IP address; and
   delivering packets to the mobile device at the point-of-attachment.

2. The method of claim 1, wherein registering a mobile device comprises registering a mobile device with a HA through a proxy server for a virtual private network (VPN), wherein the inner IP address serves as a VPN inner IP address, and wherein tunneling packets comprises tunneling packets to the proxy server from within the VPN.

3. The method of claim 2, wherein mapping the inner IP address comprises mapping the inner IP address at the proxy server.

4. The method of claim 1, further comprising moving the mobile device from the VPN to the physical point-of-attachment before registering with the HA.

5. The method of claim 1, wherein the physical point-of-attachment comprises a mobile IP wireless subnet.

6. The method of claim 1, wherein registering with the HA comprises registering the physical point-of-attachment.

7. The method of claim 1, wherein registering comprises registering through a mobile IP services driver and a mobility client.

8. The method of claim 7, wherein assigning the home IP address comprises the mobility client assigning the home IP address to a VPN client.

9. The method of claim 1, wherein registering the mobile device comprises registering the mobile device with the HA through a Mobile IP (MIP) proxy situated in a demilitarized zone (DMZ).

10. The method of claim 1, wherein assigning the home IP address comprises assigning the home IP address to a VPN client.

11. The method of claim 1, further comprising negotiating a VPN tunnel with the home IP address as the inner IP address and a static IP address as the outer IP address.

12. The method of claim 1, further comprising registering the mobile device with the HA from a second physical point-of-attachment and mapping the inner IP address to the second physical point-of-attachment of the mobile device.

13. The method of claim 12, further comprising maintaining the inner IP address for the second physical point-of-attachment as the same as for the first physical point-of-attachment.

14. A machine-readable medium having stored thereon data representing instructions which, when executed by a machine, cause the machine to perform operations comprising:
   registering a mobile device with a home agent (HA);
   once the registering has occurred, receiving at the mobile device a home internet protocol (IP) address assignment from the HA;
   assigning the home IP address to the mobile device as an inner IP address;

mapping the inner IP address to a physical point-of-attachment of the mobile device;

assigning an outer IP address directly to the mobile device from the HA;

tunneling of packets between the mobile device and the HA using the inner and outer IP address; and delivering packets to the mobile device at the point-of-attachment.

15. The medium of claim 14, wherein the instructions for registering a mobile device comprise instructions which, when executed by the machine, cause the machine to perform further operations comprising registering a mobile device with a HA through a proxy server for a virtual private network (VPN), wherein the inner IP address serves as a VPN inner IP address, and wherein the instructions for tunneling packets comprise instructions which, when executed by the machine, cause the machine to perform further operations comprising tunneling packets to the proxy server from within the VPN.

16. The medium of claim 15, wherein the instructions for registering with the HA comprise instructions which, when executed by the machine, cause the machine to perform further operations comprising registering the physical point-of-attachment.

17. The medium of claim 16, wherein the instructions for assigning the borne IP address comprise instructions which, when executed by the machine, cause the machine to perform further operations comprising the mobility client assigning the home IP address to a VPN client.

18. The medium of claim 16, further comprising instructions which, when executed by the machine, cause the machine to perform further operations comprising negotiating a VPN tunnel with the home IP address as the inner IP address and a static IP address as the outer IP address.

19. An apparatus comprising:
a mobility client to register a mobile device with a home agent (HA), to receive a home internet protocol (IP) address assignment from the HA, to assign the home IP address as an inner IP address, to map the inner IP address to a physical point-of-attachment of the mobile device, and to assign an outer IP address directly to the mobile device from the HA; and a virtual private network (VPN) client to tunnel packets for the mobile device using the inner and outer IP address, and to deliver packets from the proxy server to the mobile device at the point-of-attachment.

20. The apparatus of claim 19, wherein the mobility client registers through a proxy server for a virtual private network (VPN), wherein the inner IP address serves as a VPN inner IP address, and wherein the VPN tunnels packets to the proxy server from within the VPN.

21. The apparatus of claim 19, wherein the mobility client registers with the HA by registering the physical point-of-attachment.

22. The apparatus of claim 19, wherein the VPN client further negotiates a VPN tunnel with the home IP address as the inner IP address and a static IP address as the outer IP address.

23. An apparatus comprising:
means for registering a mobile device with a home agent (HA) through a proxy server;
means for once the registering has occurred, receiving at the mobile device a home internet protocol (IP) address assignment from the HA;
means for assigning the home IP address to the mobile device as an inner IP address;
means for mapping the inner IP address to a physical point-of-attachment of the mobile device;
means for assigning an outer IP address directly to the mobile device from the HA;
means for tunneling of packets between the mobile device and the HA to the proxy server using the inner and outer IP address; and
means for delivering packets from the proxy server to the mobile device at the point-of-attachment.

24. The apparatus of claim 23, wherein the means for registering comprises means for registering through a mobile IP services driver and a mobility client.

25. The apparatus of claim 23, wherein the proxy server comprises a Mobile IP (MIP) proxy situated in a de-militarized zone (DMZ), and wherein the means for registering comprises registering the mobile device with the HA through the MIP Proxy.

* * * * *